United States Patent
Luo et al.

(10) Patent No.: US 9,071,478 B2
(45) Date of Patent: Jun. 30, 2015

(54) METHODS FOR PERFORMING ADAPTIVE EQUALIZATION AND ASSOCIATED APPARATUS

(75) Inventors: Yan-Bin Luo, Taipei (TW); Kuan-Hua Chao, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 525 days.

(21) Appl. No.: 13/115,085

(22) Filed: May 24, 2011

(65) Prior Publication Data

US 2012/0300831 A1 Nov. 29, 2012

(51) Int. Cl.
| | |
|---|---|
| *H03H 7/30* | (2006.01) |
| *H04L 25/03* | (2006.01) |
| *H04N 21/4363* | (2011.01) |
| *G09G 5/00* | (2006.01) |

(52) U.S. Cl.
CPC .......... *H04L 25/03057* (2013.01); *H04L 25/03* (2013.01); *H04L 2025/03598* (2013.01); *H04N 21/43635* (2013.01); *G09G 5/006* (2013.01); *G09G 2370/12* (2013.01)

(58) Field of Classification Search
CPC ........ H04L 25/03–25/03019; H04L 25/03057; H04L 2025/03598; H03K 5/08–5/088; H03K 5/125; H03K 5/1252; H04N 21/43635
USPC .......................................... 375/230, 232, 233
See application file for complete search history.

(56) References Cited

U.S. PATENT DOCUMENTS

| | | | | |
|---|---|---|---|---|
| 5,191,462 | A | * | 3/1993 | Gitlin et al. .................... 398/209 |
| 8,170,163 | B2 | * | 5/2012 | Stojanovic et al. ........... 375/352 |

FOREIGN PATENT DOCUMENTS

| | | |
|---|---|---|
| CN | 1612559 A | 5/2005 |
| CN | 101013575 A | 8/2007 |

OTHER PUBLICATIONS

"Yan-Bin Luo, Ping Chen, Qui-Ting Chen, Chih-Yong Wang, Chan-Hao Chang, Szu-Jui Fu, Chien-Ming Chen, Hung-Sung Li", "A 250Mb/s-to-3.4Gb/s HDMI Receiver with Adaptive Loop Updating Frequencies and an Adaptive Equalizer", ISSCC 2009 / Session 10 / Multi-Gb/s Serial Links and Building Blocks / 10.6, 2009, pp. 190-191 and a page comprising Figure 10.6.7, 2009 IEEE International Solid-State Circuits Conference, IEEE, USA.

* cited by examiner

*Primary Examiner* — David B. Lugo

(74) *Attorney, Agent, or Firm* — Winston Hsu; Scott Margo

(57) ABSTRACT

A method for performing adaptive equalization includes: dynamically detecting current levels of a plurality of sets of pattern levels respectively corresponding to a plurality of data patterns, wherein each set of the sets of pattern levels includes a previous level, a current level, and a next level respectively corresponding to one of the plurality of data patterns; and dynamically calculating a plurality of data decision levels according to the current levels of the sets of pattern levels, for use of data decision, wherein each data decision level of at least one portion of the plurality of data decision levels is not equal to zero, and the data decision levels are dynamically adjusted in accordance with the current levels of the sets of pattern levels, in order to enhance a signal-to-noise ratio (SNR). An associated method for performing adaptive equalization is also provided. Associated apparatus are also provided.

12 Claims, 16 Drawing Sheets

| D0 | D1 | D2 | D3 | E4 | D4 | E5 | D5 | D6 | EQ Status | ISI Error |
|----|----|----|----|----|----|----|----|----|-----------|-----------|
| 0 | 1 | 0 | 0 | 0 | 1 | 0 | 0 | 1 | Under-compensation | 1 |
| 0 | 1 | 0 | 0 | 0 | 1 | 1 | 0 | 1 | | 0 |
| 0 | 1 | 0 | 0 | 1 | 1 | 0 | 0 | 1 | | 0 |
| 0 | 1 | 0 | 0 | 1 | 1 | 1 | 0 | 1 | Over-compensation | -1 |

| $D_0$ | $D_1$ | $D_2$ | $D_3$ | $E_4$ | $D_4$ | $E_5$ | $D_5$ | EQ Status | ISI Error |
|---|---|---|---|---|---|---|---|---|---|
| 1 | 0 | 0 | 1 | 0 | 0 | 0 | 1 | Under-compensation | 1 |
| 1 | 0 | 0 | 1 | 1 | 0 | 0 | 1 | | 0 |
| 1 | 0 | 0 | 1 | 0 | 0 | 1 | 1 | | 0 |
| 1 | 0 | 0 | 1 | 1 | 0 | 1 | 1 | Over-compensation | -1 |

| D[0] | D[1] | D[2] | DLEV[1] | Direction | $V_{HHL}$ |
|---|---|---|---|---|---|
| 1 | 1 | 0 | 1 | DOWN | 1 |
| 1 | 1 | 0 | 0 | UP | -1 |
| Other data patterns | | | × | × | 0 |

FIG. 7A

| D[0] | D[1] | D[2] | DLEV[1] | Direction | $V_{LHL}$ |
|---|---|---|---|---|---|
| 0 | 1 | 0 | 1 | DOWN | 1 |
| 0 | 1 | 0 | 0 | UP | -1 |
| Other data patterns | | | × | × | 0 |

FIG. 7B

METHODS FOR PERFORMING ADAPTIVE EQUALIZATION AND ASSOCIATED APPARATUS

BACKGROUND

The present invention relates to adaptive control in an apparatus equipped with equalization mechanism, and more particularly, to methods for performing adaptive equalization and to associated apparatus.

The standard of high-definition multimedia interface (HDMI), and more particularly, HDMI 1.3, specifies video serial link that operates from as low as 250 Mb/s to 3.4 Gb/s with coverage over different multimedia data formats. Widespread consumer adoption of the new HDMI standard demands receivers to reliably reproduce the incoming data stream under conditions of either short/long cables or clear/fuzzy signal. In many cases, input video signal could be quite smeared and noisy when a cheap cable is used for cost saving. As a result, some problems may occur. For example, the related art receivers typically do not operate properly in all of the cases. Thus, a novel method is required for implementing HDMI receivers that may operate properly all the time.

SUMMARY

It is therefore an objective of the claimed invention to provide methods for performing adaptive equalization and to provide associated apparatus, in order to solve the above-mentioned problems.

It is another objective of the claimed invention to provide methods for performing adaptive equalization and to provide associated apparatus, in order to satisfy a wide range of operation conditions of receivers for serial link applications.

It is another objective of the claimed invention to provide methods for performing adaptive equalization and to provide associated apparatus, in order to implement a receiver that is capable of adaptively adjusting its loop frequency response with respect to the stream-in data rate. In particular, the receiver implemented based upon the present invention methods is equipped with adaptive control mechanism for both equalization and data recovery, and is suitable for serial link applications.

An exemplary embodiment of a method for performing adaptive equalization is provided, where the method is applied to a decision feedback equalizer (DFE) data recovery circuit for a linear equalizer. The method comprises: dynamically detecting current levels of a plurality of data patterns, wherein each data pattern comprises a previous level, a current level, and a next level; and dynamically adjusting a data decision level according to the current levels of the data patterns, for use of data decision, in order to enhance a signal-to-noise ratio (SNR) of data from the DFE data recovery circuit.

An exemplary embodiment of an apparatus for performing adaptive equalization comprises a linear equalizer, an adaptive control circuit, and a DFE data recovery circuit. The linear equalizer is arranged to perform equalization, and the adaptive control circuit is arranged to perform adaptive control. In addition, the DFE data recovery circuit is arranged to perform data recovery, wherein under control of the adaptive control circuit, the DFE data recovery circuit dynamically detects current levels of a plurality of data patterns, wherein each data pattern comprises a previous level, a current level, and a next level. Additionally, a data decision level for use of data decision is dynamically adjusted in accordance with the current levels of the data patterns, in order to enhance a SNR of data from the DFE data recovery circuit.

An exemplary embodiment of a method for performing adaptive equalization is provided, where the method is applied to a linear equalizer. The method comprises: detecting at least a portion of a series of data bits and at least a portion of a series of edge values associated to the series of data bits; and monitoring whether a linear combination of the portion of the series of edge values is equal to a specific value in a situation where a specific data pattern is detected, and adjusting at least one parameter of the linear equalizer accordingly.

An exemplary embodiment of an apparatus for performing adaptive equalization comprises a linear equalizer, a DFE data recovery circuit, and an adaptive control circuit. The linear equalizer is arranged to perform equalization In addition, the DFE data recovery circuit is arranged to detect at least a portion of a series of data bits and at least a portion of a series of edge values associated to the series of data bits. Additionally, the adaptive control circuit is arranged to monitor whether a linear combination of the portion of the series of edge values is equal to a specific value in a situation where a specific data pattern is detected, and to adjust at least one parameter of the linear equalizer accordingly.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 7A-7B respectively illustrate some implementation details of the method shown in FIG. 2A according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
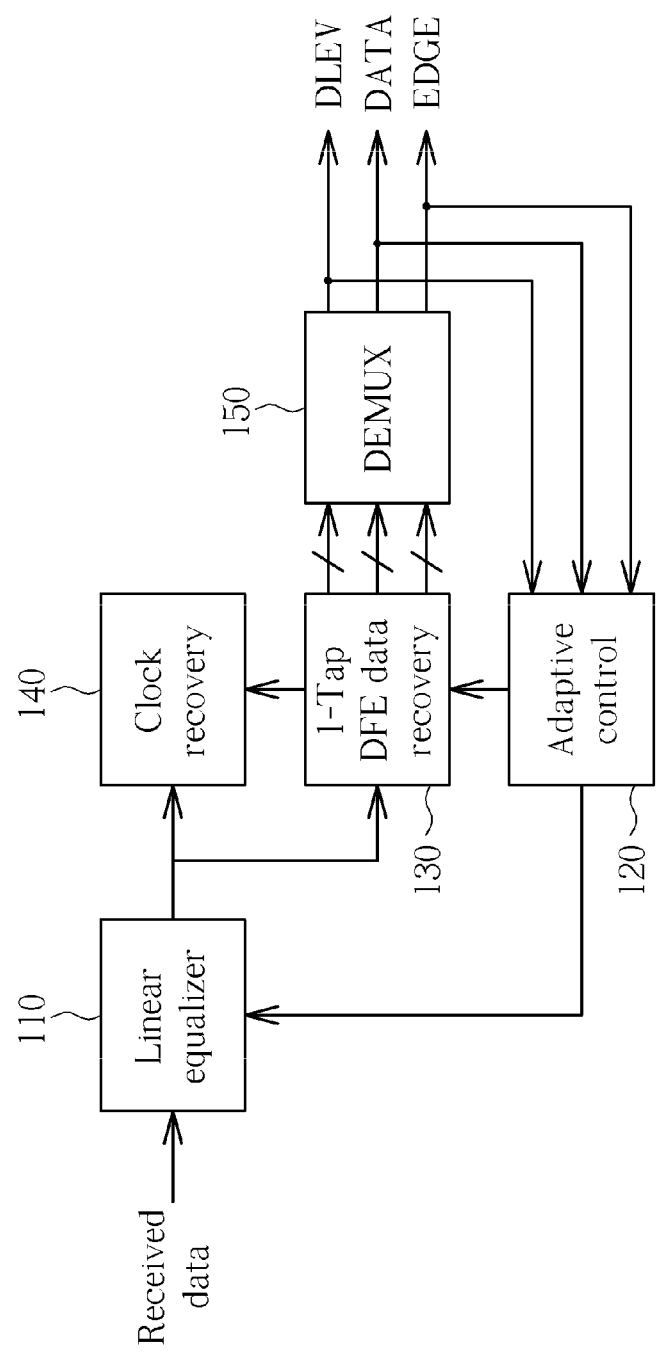
FIG. 1A is a diagram of an apparatus for performing adaptive equalization according to a first embodiment of the present invention.

Please refer to FIG. 1A, which illustrates a diagram of an apparatus 100 for performing adaptive equalization according to a first embodiment of the present invention. For example, the apparatus 100 may comprise at least a portion (e.g. a portion or all) of a High-Definition Multimedia Interface (HDMI) receiver. This is for illustrative purposes only, and is not meant to be a limitation of the present invention. According to some variations of this embodiment, the apparatus 100 can be utilized in various kinds of serial link applications, such as Peripheral Component Interconnect Express (PCI Express, or PCIE) applications (more particularly, PCIE version 2.0 or above), Universal Serial Bus (USB) 3.0 applications, Serial Advanced Technology Attachment (Serial ATA, or SATA) applications (more particularly, SATA version 3.0 or above). In particular, the apparatus 100 is especially suitable for serial link applications with a data rate that is greater than or equal to 5 gigabits per second (Gbit/s).

As shown in FIG. 1A, the apparatus 100 comprises a linear equalizer 110, an adaptive control circuit 120 (labeled "Adaptive control"), a decision feedback equalizer (DFE) data recovery circuit 130 such as a 1-Tap DFE data recovery circuit (labeled "1-Tap DFE data recovery"), a clock recovery circuit 140 (labeled "Clock recovery"), and a demultiplexing module 150 (labeled "DEMUX"). For example, the DFE data recovery circuit 130 may comprise a plurality of latches and the demultiplexing module 150 may comprise a plurality of demultiplexers, associated switching circuits, and/or at least one deserializer, in order to output respective bits DLEV[(M−1):0], DATA[(M−1):0], and EDGE[(M−1):0] of the signals DLEV, DATA, and EDGE, where an exemplary value of the bit count M can be 10. In another example, the DFE data recovery circuit 130 and the demultiplexing module 150 can be integrated into the same module, such as a hybrid module that comprises a plurality of latches, a plurality of demultiplexers, associated switching circuits, and/or at least one deserializer, in order to output the respective bits DLEV[(M−1):0], DATA[(M−1):0], and EDGE[(M−1):0] of the signals DLEV, DATA, and EDGE, where an exemplary value of the bit count M can be 10.

According to this embodiment, the linear equalizer 110 is arranged to perform equalization on received data, and the adaptive control circuit 120 is arranged to perform adaptive control. In addition, the DFE data recovery circuit 130 is arranged to perform data recovery, wherein under control of the adaptive control circuit 120, the DFE data recovery circuit 130 can dynamically detect current levels of a plurality of data patterns, where each data pattern comprises a previous level, a current level, and a next level. Additionally, the adaptive control circuit 120 can dynamically calculate/adjust one or more of a plurality of data decision levels according to the current levels of the data patterns, for use of data decision, where at least one portion of the plurality of data decision levels is not equal to zero, and the data decision levels are dynamically adjusted in accordance with the current levels of the data patterns, in order to enhance a signal-to-noise ratio (SNR) of data from the DFE data recovery circuit 130.

Please note that there are feedback paths for inputting the signals DLEV, DATA, and EDGE into the adaptive control circuit 120, and the adaptive control circuit 120 can perform adaptive control on the linear equalizer 110 and the DFE data recovery circuit 130 according to the signals DLEV, DATA, and EDGE. For example, the adaptive control circuit 120 can send control codes such as digital codes to the linear equalizer 110 and the DFE data recovery circuit 130, where the linear equalizer 110 and the DFE data recovery circuit 130 are equipped with some digital-to-analog converters (DACs) arranged to convert the control codes into associated control signals of the linear equalizer 110 and the DFE data recovery circuit 130. In another example, the adaptive control circuit 120 generates control codes such as digital codes, and utilizes some DACs therein to convert the control codes into associated control signals for controlling the linear equalizer 110 and the DFE data recovery circuit 130.

Figure 1B:
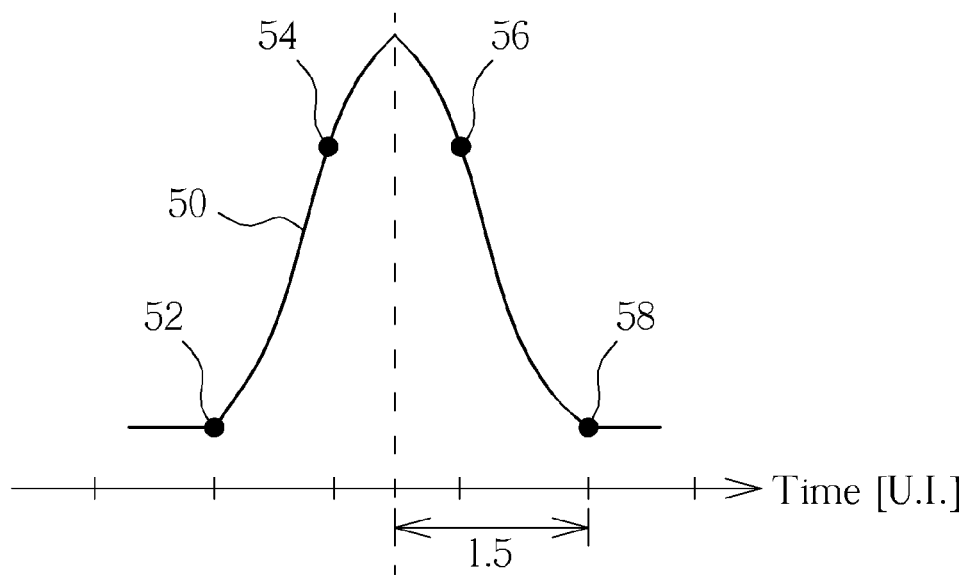
FIG. 1B illustrates an equalization scheme of the apparatus shown in FIG. 1A according to an embodiment of the present invention.

In this embodiment, the apparatus 100 can operate properly according to an equalization scheme such as that shown in FIG. 1B with the aid of SNR enhancement based upon the architecture shown in FIG. 1A since the SNR enhancement provide the adaptive control circuit 120 with extremely accurate feedback information for adaptively controlling the linear equalizer. In particular, the apparatus 100 can perform adaptive equalization, in order to correct the response curve 50 by adjusting at least a portion (e.g. a portion or all) of the control points 52, 54, 56, and 58 respectively corresponding to some sampling time points, where the time is measured in units of Unit Interval (U.I.) (e.g. a period corresponding to the data rate of the received data), and therefore, the horizontal axis is labeled "Time [U.I.]". For example, the horizontal distance between the control points 58 (or the control points 52) and the axis of symmetry of the response curve 50 is equal to 1.5 U.I. (which is simply labeled "1.5" in FIG. 1B). According to this embodiment, by performing adaptive equalization, the apparatus 100 can control the control points 52 and 58 to be zero. As a result, inter symbol interference (ISI) can be eliminated. Please note that the response curve 50 of this embodiment is symmetric. This is for illustrative purposes only, and is not meant to be a limitation of the present invention. According to some variations of this embodiment, it is unnecessary that the response curve 50 is symmetric, and the dashed line shown in FIG. 1B (e.g. the vertical line passing through the maximum of the response curve 50) can be referred to as the reference line or the reference axis. For simplicity, a symmetric curve such as that illustrated in FIG. 1B is taken as an example of the response curve 50 mentioned above in the following embodiments/variations.

Figure 2A:
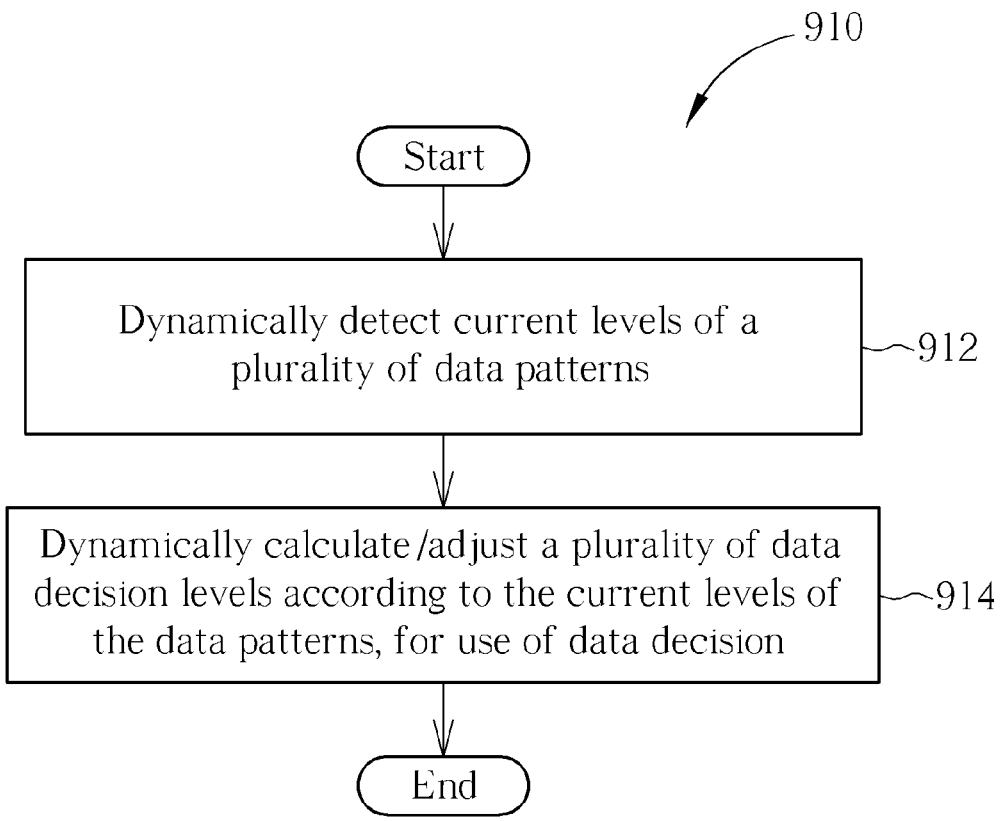
FIG. 2A is a flowchart of a method for performing adaptive equalization according to an embodiment of the present invention.

FIG. 2A is a flowchart of a method 910 for performing adaptive equalization according to an embodiment of the present invention. The method 910 can be applied to the apparatus 100 shown in FIG. 1A, and more particularly, can be applied to the adaptive control circuit 120. The method is described as follows.

In Step 912, under control of the adaptive control circuit 120, the DFE data recovery circuit 130 dynamically detects current levels of a plurality of data patterns, where each data pattern comprises a previous level, a current level, and a next level.

In Step 914, the adaptive control circuit 120 dynamically calculates/adjusts a plurality of data decision levels according to the current levels of the data patterns, for use of data decision, where at least one portion of the plurality of data decision levels is not equal to zero, and the data decision levels are dynamically adjusted in accordance with the current levels of the data patterns, in order to enhance the SNR of data from the DFE data recovery circuit 130. For example, the data patterns may comprise a first data pattern and a second data pattern, and the adaptive control circuit 120 may calculate a first data decision level of the plurality of data decision levels according to a current level corresponding to the first data pattern and a current level corresponding to the second data pattern.

In particular, the current level corresponding to the first data pattern and the current level corresponding to the second data pattern belong to different logic values (e.g. different logic values 0 and 1, or different logic values 1 and 0), respectively. More specifically, the adaptive control circuit 120 can calculate an average of the current level of the first data pattern and the current level of the second data pattern to generate the first data decision level of the plurality of data decision levels. In practice, the adaptive control circuit 120 can invert the first data decision level to generate a second data decision level of the plurality of data decision levels. For example, the first data pattern is a high-high-low (HHL) data pattern (whose previous level, current level, and next level are high, high, and low levels, respectively), and the second data pattern is a high-low-high (HLH) data pattern (whose previous level, current level, and next level are high, low, and high levels, respectively). Thus, referring to FIG. 2B, the adaptive control circuit 120 calculates an average 222 of the current level 212 of the HHL data pattern (e.g. the data pattern H-H-L of the curves shown in FIG. 2C, with the previous, the current, and the next levels thereof being respectively labeled "H", "H", and "L") and the current level 216 of the HLH data pattern (e.g. the data pattern H-L-H of the curves shown in FIG. 2D, with the previous, the current, and the next levels thereof being respectively labeled "H", "L", and "H") to generate the first data decision level $V_{TH}$, and further inverts the first data decision level to generate the second data decision level $-V_{TH}$. In another example, the first data pattern is a low-low-high (LLH) data pattern (whose previous level, current level, and next level are low, low, and high levels, respectively), and the second data pattern is a low-high-low (LHL) data pattern (whose previous level, current level, and next level are low, high, and low levels, respectively). Thus, referring to FIG. 2B, the adaptive control circuit 120 calculates an average 228 of the current level 218 of the LLH data pattern (e.g. the data pattern L-L-H of the curves shown in FIG. 2E, with the previous, the current, and the next levels thereof being respectively labeled "L", "L", and "H") and the current level 214 of the LHL data pattern (e.g. the data pattern L-H-L of the curves shown in FIG. 2F, with the previous, the current, and the next levels thereof being respectively labeled "L", "H", and "L") to generate the first data decision level $-V_{TH}$, and further inverts the first data decision level to generate the second data decision level $V_{TH}$. This is for illustrative purposes only, and is not meant to be a limitation of the present invention. According to some variations of this embodiment, the current level corresponding to the first data pattern and the current level corresponding to the second data pattern belong to the same logic value (e.g. the same logic value 0, or the same logic value 1). More specifically, in these variations, the adaptive control circuit 120 can calculate a difference between the current level of the first data pattern and the current level of the second data pattern to generate the first data decision level of the plurality of data decision levels. For example, the first data pattern is an HHL data pattern, and the second data pattern is a LHL data pattern. Thus, the adaptive control circuit 120 calculates a difference between the current level of the HHL data pattern and the current level of the LHL data pattern to generate the first data decision level of the plurality of data decision levels $V_{TH}$ and $-V_{TH}$, such as the decision level $V_{TH}$, and further inverts the first data decision level to generate the second data decision level such as the decision level $-V_{TH}$, where the difference may be equal to or similar to the average 222 mentioned above. In another example, the first data pattern is a LLH data pattern, and the second data pattern is an HLH data pattern. Thus, the adaptive control circuit 120 calculates a difference between the current level of the LLH data pattern and the current level of the HLH data pattern to generate the first data decision level of the plurality of data decision levels $V_{TH}$ and $-V_{TH}$, such as the decision level $-V_{TH}$, and further inverts the first data decision level to generate the second data decision level such as the decision level $V_{TH}$, where the difference may be equal to or similar to the average 228 mentioned above.

Figure 2B:
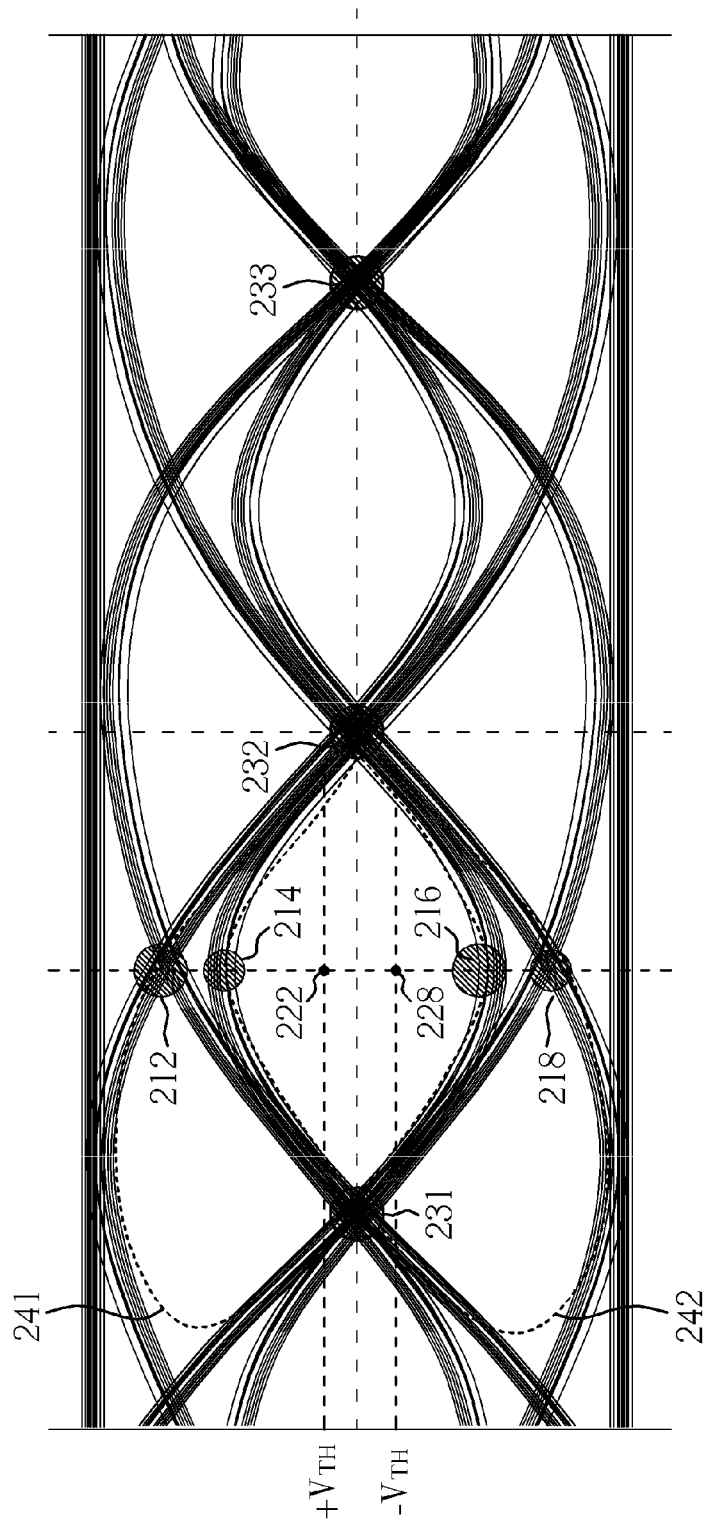
FIGS. 2B-2F illustrate some implementation details of the method shown in FIG. 2A according to an embodiment of the present invention.
Figure 2C:
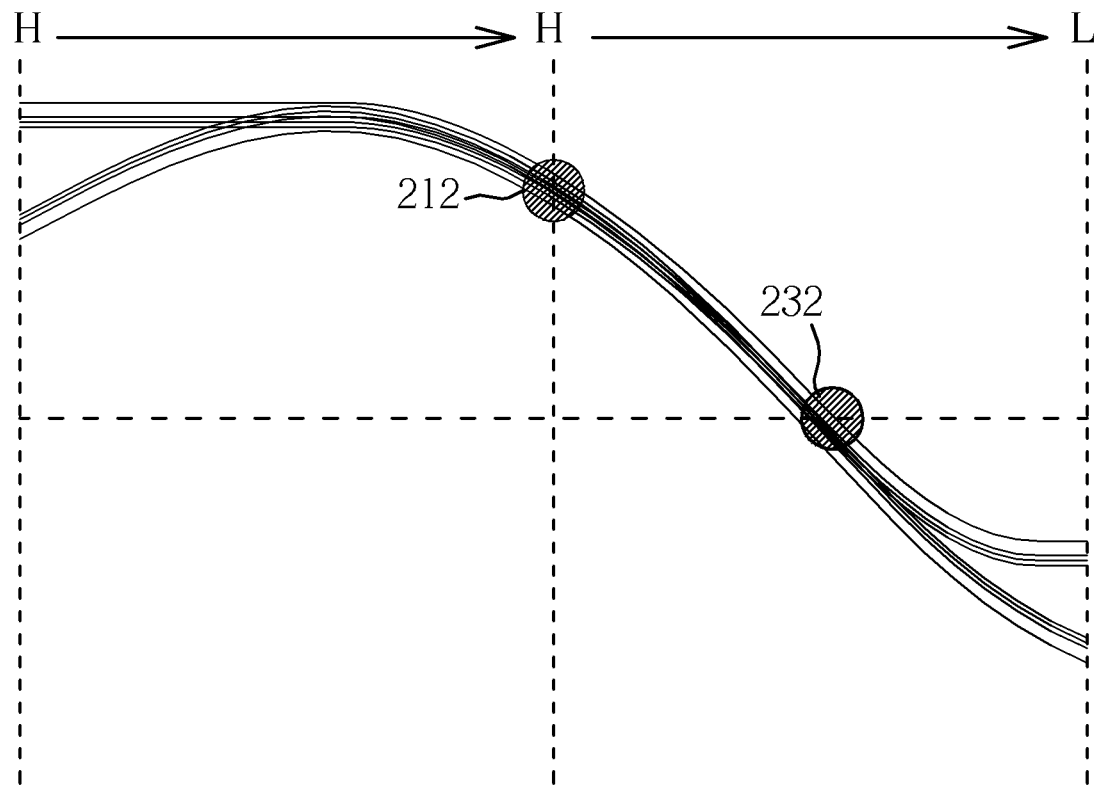
Figure 2D:
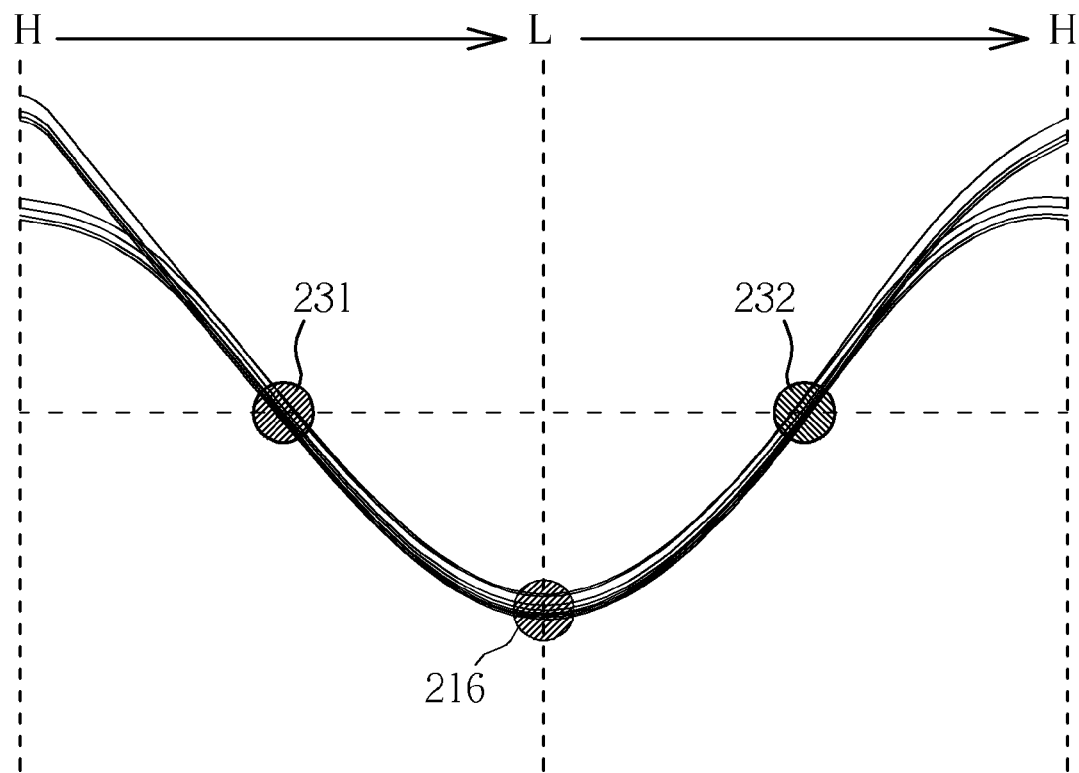
Figure 2E:
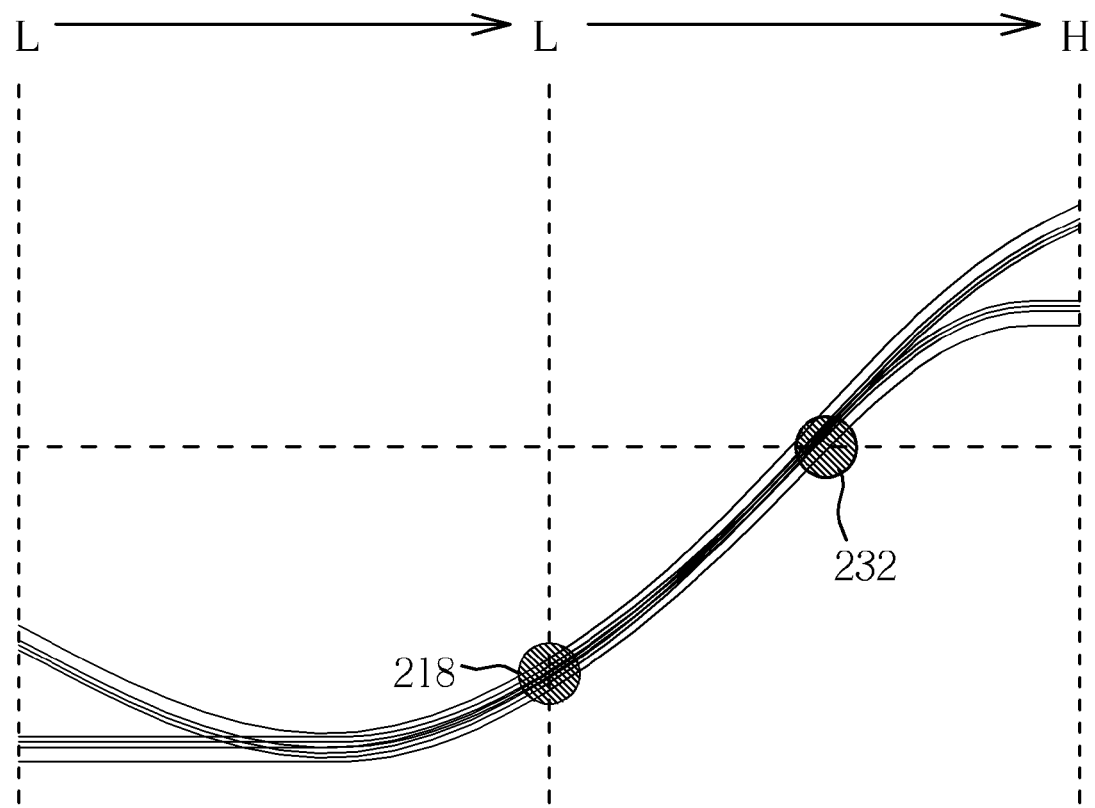
Figure 2F:
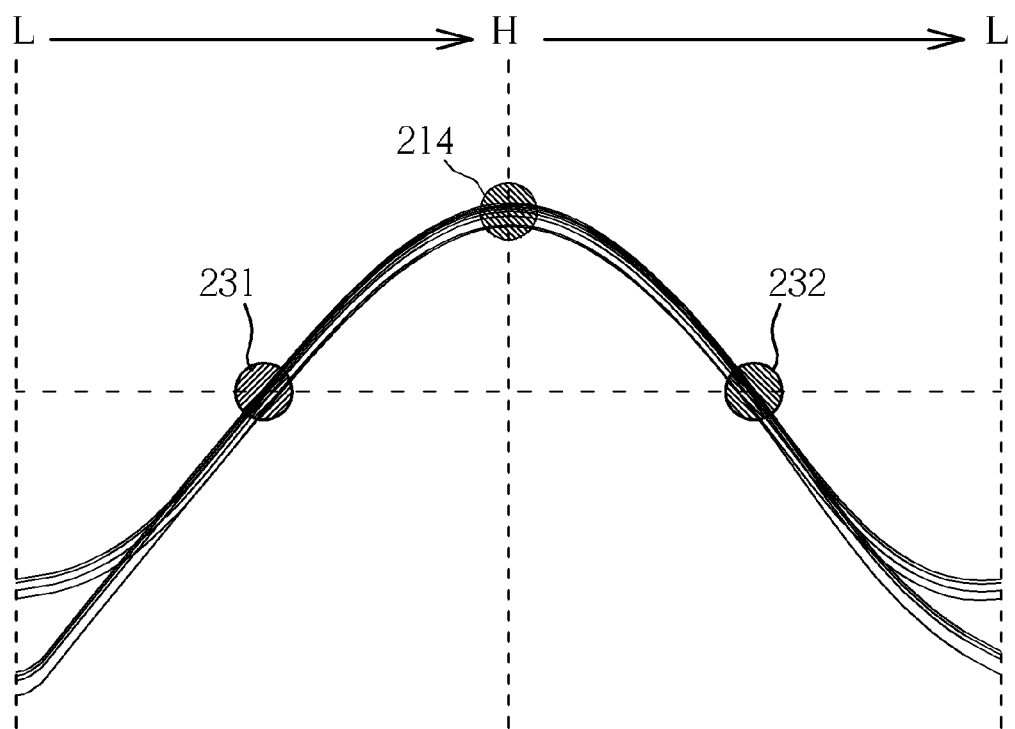

As shown in FIG. 2B, the intersection points around the zero level, such as the intersection points 231, 232, and 233 of the overlapped curves, are typically utilized as clock recovery locking phases (e.g. the locking phases of clock recovery performed by the clock recovery circuit 140). Please note that the data decision timing of the DFE data recovery circuit 130 is typically arranged at the center point between two of the clock recovery locking phases mentioned above, such as the center point between the two clock recovery locking phases 231 and 232. In addition, the two eyes 241 and 242 correspond to two partial responses, respectively. For example, the upper eye 241 corresponds to a high partial response of some data patterns whose previous levels are high levels (e.g. HHL and HLH data patterns), where the high partial response can also be referred to as high-previous-level partial response. In another example, the lower eye 242 corresponds to a low partial response of some data patterns whose previous levels are low levels (e.g. LLH and LHL data patterns), where the low partial response can also be referred to as low-previous-level partial response.

Thus, the adaptive control circuit 120 dynamically calculates different data decision levels for the two partial responses, respectively. For example, in a situation where the first data decision level is greater than the second data decision level (e.g. in a situation where the first data decision level is positive and the second data decision level is negative), the adaptive control circuit 120 dynamically calculates the first data decision level for the high-previous-level partial response, and dynamically calculates the second data decision level for the low-previous-level partial response. In another example, in a situation where the first data decision level is less than the second data decision level (e.g. in a situation where the first data decision level is negative and the second data decision level is positive), the adaptive control circuit 120 dynamically calculates the first data decision level for the low-previous-level partial response, and dynamically calculates the second data decision level for the high-previous-level partial response.

According to this embodiment, the DFE data recovery circuit 130 can dynamically detect the current levels (e.g. the current levels 212, 214, 216, and 218) of data patterns according to at least one previous version of the plurality of data decision levels (e.g. the previous version(s) of the data decision levels $V_{TH}$ and $-V_{TH}$). As time goes by, the DFE data recovery circuit 130 dynamically updates the plurality of data decision levels such as the data decision levels $V_{TH}$ and $-V_{TH}$. As a result, when needed, the DFE data recovery circuit 130 can always correctly detect any current level corresponding to any data pattern, such as any current level corresponding to one of the data patterns mentioned above.

Figure 3A:
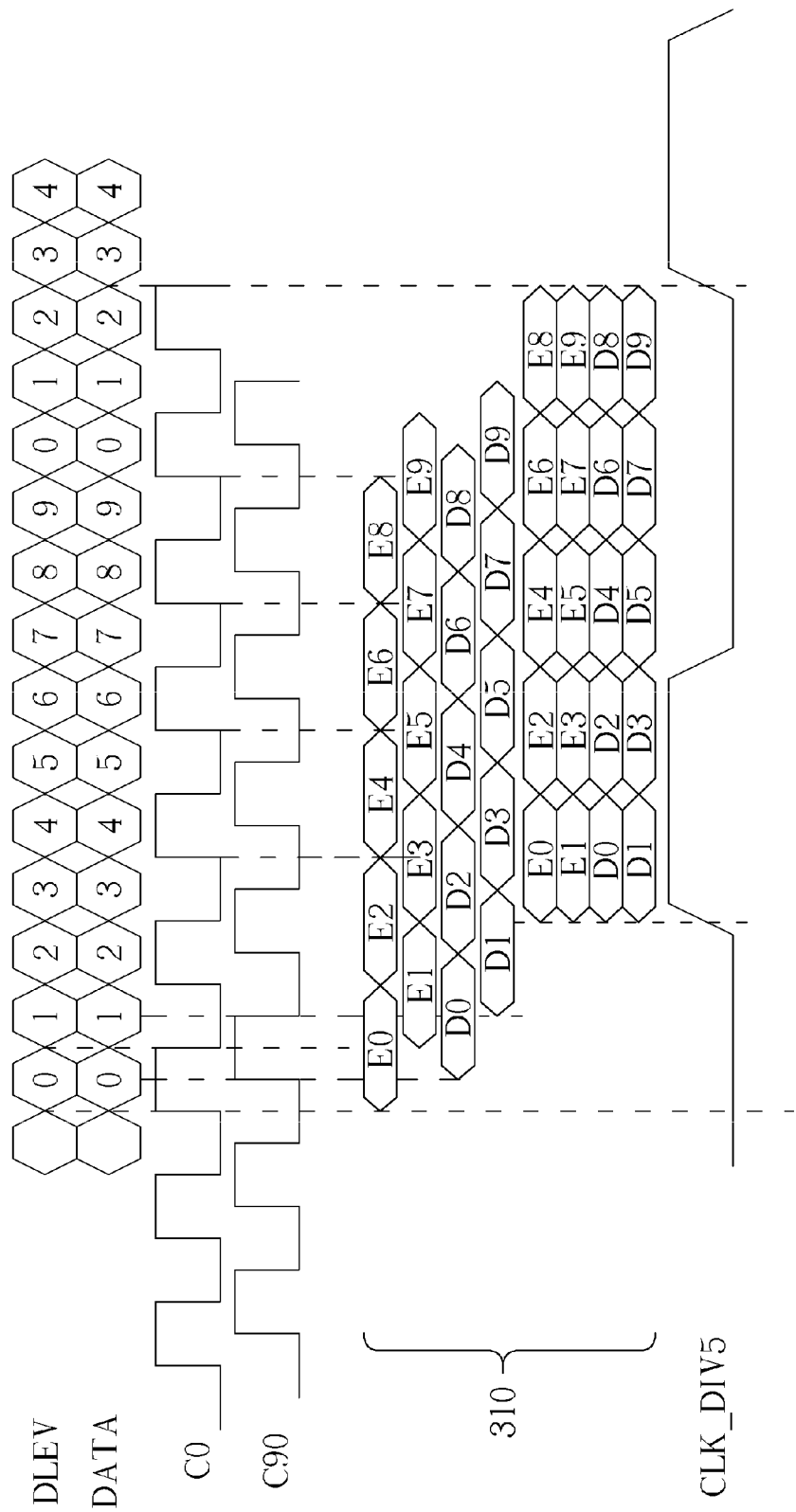
FIGS. 3A-3B respectively illustrate a first portion and a second portion of a timing chart of associated signals involved with the method shown in FIG. 2A according to an embodiment of the present invention.
Figure 3B:
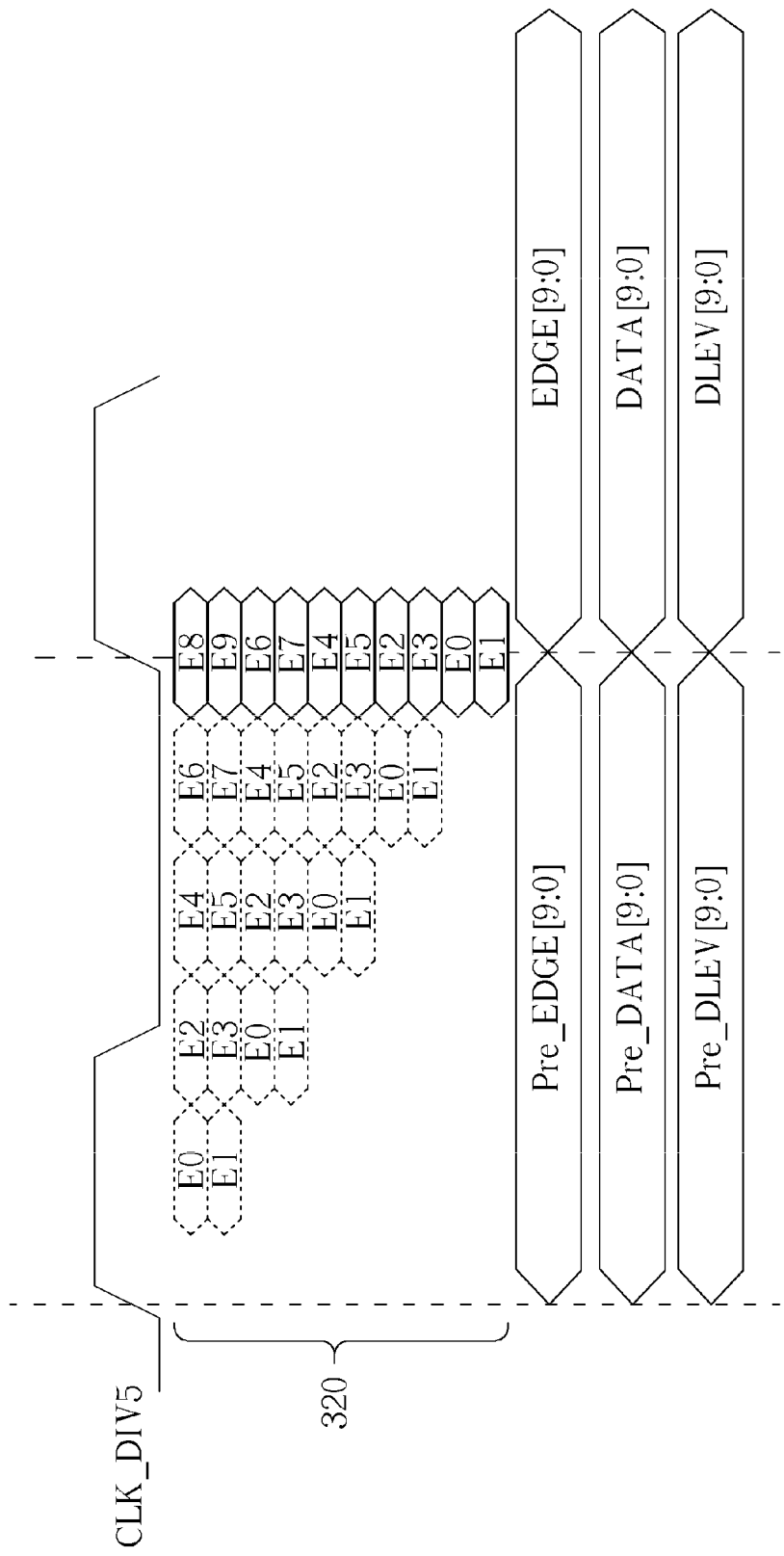

FIGS. 3A-3B respectively illustrate a first portion 310 and a second portion 320 of a timing chart of associated signals involved with the method 910 shown in FIG. 2A according to an embodiment of the present invention, where the first portion 310 illustrates operations of at least one half rate 1-to-2 deserializer of the aforementioned at least one deserializer for implementing the architecture shown in FIG. 1A, and the second portion 320 illustrates operations of at least one 2-to-10 shift-register deserializer of the aforementioned at least one deserializer for implementing the architecture shown in FIG. 1A.

As shown in FIG. 3A, the numerals such as {0, 1, 2, 3, 4, 5, 6, 7, 8, 9, 0, 1, 2, 3, 4, ...} illustrated in the signals DLEV and DATA are utilized for denoting respective periods thereof, rather than representing values carried by the signals DLEV and DATA. In addition, the notations C0 and C90 respectively represent a clock signal having a zero phase and an associated clock signal having a 90-degree phase, and the notation CLK_DIV5 represents another clock signal having a frequency that is equal to one fifth (⅕) of the frequency of the clock signals C0 and C90. Please note that additional two clock signals respectively having a 180-degree phase and a 270-degree phase can be obtained from inverting the clock signals C0 and C90. For example, these clock signals can be generated by the clock recovery circuit 140. Additionally, some latches such as a portion of the aforementioned latches for implementing the architecture shown in FIG. 1A can be utilized for latching edge values {E0, E2, E4, E6, E8} and {E1, E3, E5, E7, E9} according to the clock signals C0 and C180, respectively. Similarly, some other latches such as another portion of the aforementioned latches for implementing the architecture shown in FIG. 1A can be utilized for latching data values {D0, D2, D4, D6, D8} and {D1, D3, D5, D7, D9} according to the clock signals C90 and C270, respectively.

Thus, the aforementioned at least one half rate 1-to-2 deserializer deserializes the edge values {E0, E2, E4, E6, E8} and {E1, E3, E5, E7, E9} and the data values {D0, D2, D4, D6, D8} and {D1, D3, D5, D7, D9} illustrated in the upper half of the first portion 310, in order to output deserialized results such as the edge values {E0, E2, E4, E6, E8} and {E1, E3, E5, E7, E9} and the data values {D0, D2, D4, D6, D8} and {D1, D3, D5, D7, D9} illustrated in the lower half of the first portion 310. Please note that the method for obtaining the data values {D0, D2, D4, D6, D8} and {D1, D3, D5, D7, D9} illustrated in the lower half of the first portion 310 can be utilized for obtaining the respective values {DLEV0, DLEV2, DLEV4, DLEV6, DLEV8} and {DLEV1, DLEV3, DLEV5, DLEV7, DLEV9} of the signal DLEV.

As shown in FIG. 3B, the notations DLEV[9:0], DATA[9:0], and EDGE[9:0] respectively represent current values of the aforementioned respective bits DLEV[(M−1):0], DATA[(M−1):0], and EDGE[(M−1):0] of the signals DLEV, DATA, and EDGE in a situation where the bit count M is equal to 10. In addition, the notations Pre_DLEV[9:0], Pre_DATA[9:0], and Pre_EDGE[9:0] respectively represent previous values of the aforementioned respective bits DLEV[(M−1):0], DATA[(M−1):0], and EDGE[(M−1):0] of the signals DLEV, DATA, and EDGE in the same situation where the bit count M is equal to 10. Referring to the second portion 320, the 2-to-10 shift-register deserializer mentioned above deserializes the edge values {E0, E2, E4, E6, E8} and {E1, E3, E5, E7, E9} illustrated in the uppermost two rows of the first portion 310 (e.g. some of the deserialized results of the half rate 1-to-2 deserializer, such as the edge values {E0, E2, E4, E6, E8} and {E1, E3, E5, E7, E9} obtained from the half rate 1-to-2 deserializer), in order to output deserialized results such as the edge values {E0, E2, E4, E6, E8} and {E1, E3, E5, E7, E9} illustrated in the rightmost column of the second portion 320. Please note that, within the second portion 320 shown in FIG. 3B, the ten rows of edge values respectively correspond to ten registers within the 2-to-10 shift-register deserializer, where the edge values illustrated with dashed lines (e.g. those except for the rightmost column, within the second portion 320) represent transient values of the respective registers in the 2-to-10 shift-register deserializer.

As a result, the apparatus 100 utilizes the deserialized results of the 2-to-10 shift-register deserializer, such as the edge values {E9, E8, E7, E6, E5, E4, E3, E2, E1, E0} illustrated in the rightmost column of the second portion 320, as the current values of the respective bits EDGE[9:0] of the signal EDGE. Similarly, the apparatus 100 can obtain deserialized results such as the data values {D9, D8, D7, D6, D5, D4, D3, D2, D1, D0} according to the same method, and utilize these data values {D9, D8, D7, D6, D5, D4, D3, D2, D1, D0} as the current values of the respective bits DATA[9:0] of the signal DATA. In addition, the apparatus 100 can obtain deserialized results such as the values {DLEV9, DLEV8, DLEV7, DLEV6, DLEV5, DLEV4, DLEV3, DLEV2, DLEV1, DLEV0} according to the same method, and utilize these values {DLEV9, DLEV8, DLEV7, DLEV6, DLEV5, DLEV4, DLEV3, DLEV2, DLEV1, DLEV0} as the current values of the respective bits DLEV[9:0] of the signal DLEV.

In practice, the aforementioned at least one half rate 1-to-2 deserializer may comprise a plurality of half rate 1-to-2 deserializers respectively for edge value deserialization and data value deserialization, and the aforementioned at least one 2-to-10 shift-register deserializer may comprise a plurality of 2-to-10 shift-register deserializers respectively for edge value deserialization and data value deserialization. This is for illustrative purposes only, and is not meant to be a limitation of the present invention. The plurality of half rate 1-to-2 deserializers can be regarded as different deserialization channels (e.g. an edge value deserialization channel and a data value deserialization channel) of the aforementioned at least one half rate 1-to-2 deserializer, and the plurality of 2-to-10 shift-register deserializers can be regarded as different deserialization channels (e.g. an edge value deserialization channel and a data value deserialization channel) of the aforementioned at least one 2-to-10 shift-register deserializer.

Figure 4:
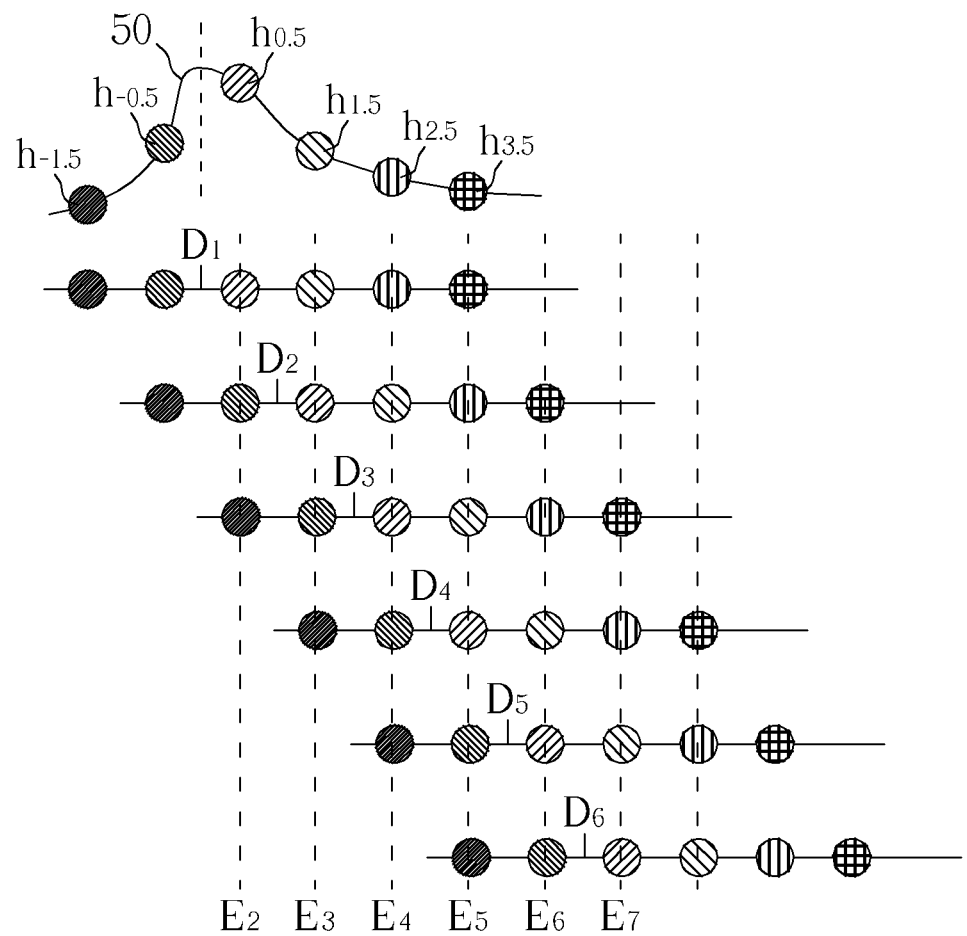
FIG. 4 illustrates some implementation details of the method shown in FIG. 2A according to an embodiment of the present invention.

FIG. 4 illustrates some implementation details of the method 910 shown in FIG. 2A according to an embodiment of the present invention. The notations $h_{0.5}$, $h_{1.5}$, $h_{2.5}$, $h_{3.5}$, ..., etc. and the notations $h_{-0.5}$, $h_{-1.5}$, $h_{-2.5}$, $h_{-3.5}$, ..., etc. represent response curve parameters of the response curve 50 with respective to a data bit under consideration, such as the data bit $D_1$ of a series of data bits $D_0$, $D_1$, $D_2$, $D_3$, $D_4$, $D_5$, $D_6$, ..., etc., where the notations $E_1$, $E_2$, $E_3$, $E_4$, $E_5$, $E_6$, $E_7$, ..., etc. are utilized for representing the edge values that may be detected at the time points of edges of the signal DATA. For example, the series of data bits $D_0$, $D_1$, $D_2$, $D_3$, $D_4$, $D_5$, $D_6$, ..., etc. can be at least a portion of the bits of the signal DATA. As shown in FIG. 4, the edge values are contributed by several adjacent data bits considering the ISI effect. For example, the edge values $E_4$ and $E_5$ can be expressed according to the following equations:

$$E_4 = D_0 * h_{3.5} + D_1 * h_{2.5} + D_2 * h_{1.5} + D_3 * h_{0.5} + D_4 * h_{-0.5} + D_5 * h_{-1.5} + D_6 * h_{-1.5}; \text{ and}$$

$$E_5 = D_0 * h_{4.5} + D_1 * h_{3.5} + D_2 * h_{2.5} + D_3 * h_{1.5} + D_4 * h_{0.5} + D_5 * h_{-0.5} + D_6 * h_{-1.5};$$

In order to perform the aforementioned adaptive equalization to train a non-ideal pulse response into an ideal pulse response, the DFE data recovery circuit 130 detects at least a portion of the series of data bits $D_0$, $D_1$, $D_2$, $D_3$, $D_4$, $D_5$, $D_6$, . . . , etc. and at least a portion of a series of edge values $E_1$, $E_2$, $E_3$, $E_4$, $E_5$, $E_6$, $E_7$, . . . , etc. associated to the series of data bits $D_0$, $D_1$, $D_2$, $D_3$, $D_4$, $D_5$, $D_6$, . . . , etc., and the adaptive control circuit 120 monitors whether a linear combination of the portion of the series of edge values is equal to a specific value (such as zero) in a situation where a specific data pattern is detected, and adjusts at least one response curve parameter of the linear equalizer 110 (e.g. at least one response curve parameter of the response curve parameters $\{h_{-0.5}, h_{-1.5}, h_{-2.5}, h_{-3.5}, \ldots\}$ and $\{h_{0.5}, h_{1.5}, h_{2.5}, h_{3.5}, \ldots\}$ mentioned above) accordingly. In practice, the aforementioned linear combination of the portion of the series of edge values can be a summation of normalized levels of the portion of the series of edge values. For example, in a situation where a low-high-low-low-high-low-high (LHLLHLH) data pattern (e.g. a 0100101 data pattern, in terms of logical values 0 and 1) is detected, such as the situation shown in FIG. 5A, the portion of the series of edge values may comprise the edge values $E_4$ and $E_5$. In another example, in a situation where a high-low-low-high-low-high (HLLHLH) data pattern (e.g. a 100101 data pattern, in terms of logical values 0 and 1) is detected, such as the situation shown in FIG. 6A, the portion of the series of edge values may comprise the edge values $E_4$ and $E_5$.

Figures 5A, 5B:
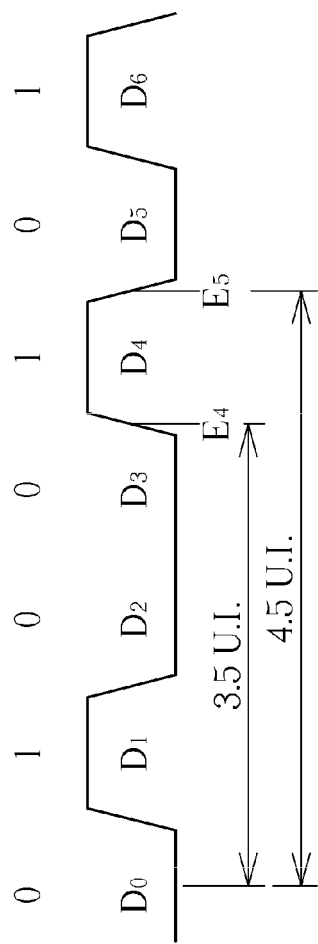
FIGS. 5A-5B respectively illustrate some implementation details of the method shown in FIG. 2A according to an embodiment of the present invention.

Referring to FIG. 5A, suppose that the logical values $\{0, 1, 0, 0, 1, 0, 1\}$ of the LHLLHLH data pattern correspond to normalized levels $\{-1, 1, -1, -1, 1, -1, 1\}$, respectively. Thus, in a situation where the data bits $\{D_0, D_1, D_2, D_3, D_4, D_5, D_6\}$ are respectively replaced by the normalized levels $\{-1, 1, -1, -1, 1, -1, 1\}$, the edge values $E_4$ and $E_5$ can be written as follows:

$$E_4 = -h_{3.5} + h_{2.5} - h_{1.5} - h_{0.5} + h_{-0.5} - h_{-1.5} + h_{-2.5}; \text{ and}$$

$$E_5 = -h_{4.5} + h_{3.5} - h_{2.5} - h_{1.5} + h_{0.5} - h_{-0.5} + h_{-1.5};$$

In this embodiment, the response curve parameters $h_{4.5}$ and $h_{-2.5}$ are minor in comparison with the other response curve parameters in the above equations, and therefore, can be omitted. Thus, the edge values $E_4$ and $E_5$ can be written as follows:

$$E_4 = -h_{1.5} + K; \text{ and}$$

$$E_5 = -h_{1.5} - K;$$

where $K = -h_{3.5} + h_{2.5} - h_{0.5} + h_{-0.5} - h_{-1.5}$. As a result, the summation of the edge values $E_4$ and $E_5$ can be written as follows:

$$E_4 + E_5 = -2 \ast h_{1.5};$$

where the above equation implies that the summation of the normalized levels of the edge values $E_4$ and $E_5$ mainly correspond to the response curve parameter $h_{1.5}$, which in an ideal response curve should be zero. Thus, by monitoring whether the aforementioned summation of the normalized levels of the portion of the series of edge values (e.g. the summation of the normalized levels of the edge values $E_4$ and $E_5$) is equal to zero, the adaptive control circuit 120 can dynamically check whether the response curve 50 is appropriately equalized. As a result of monitoring whether the aforementioned summation of the normalized levels of the portion of the series of edge values is equal to zero, the adaptive control circuit 120 can dynamically adjusts the linear equalizer 110.

Please refer to FIG. 5B, which illustrates a table comprising some possible mapping results that may be obtained in a situation where the LHLLHLH data pattern (e.g. the 0100101 data pattern) is detected. Regarding the field "ISI Error", the mapping results "1", "0", and "−1" represent the meanings of "Under-compensation", "Don't care", and "Over-compensation", respectively. By utilizing the table shown in FIG. 5B, the adaptive control circuit 120 can dynamically adjusts the parameters of the linear equalizer 110 to make the response curve parameters $h_{-1.5}$ and $h_{1.5}$ be zero, i.e., the adaptive control circuit 120 can control the control points 52 and 58 shown in FIG. 1B to be zero. For example, the mapping result "1" (which means "Under-compensation" in this embodiment) indicates that the control points 52 and 58 are too high, and the response curve parameters $h_{-1.5}$ and $h_{1.5}$ should be decreased. In another example, the mapping result "−1" (which means "Over-compensation" in this embodiment) indicates that the control points 52 and 58 are too low, and the response curve parameters $h_{-1.5}$ and $h_{1.5}$ should be increased.

Figures 6A, 6B:
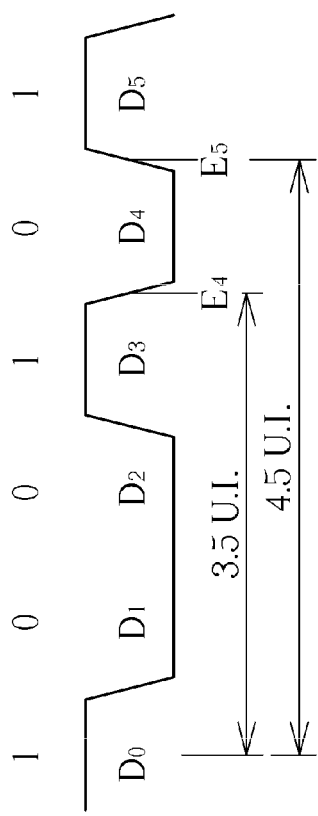
FIGS. 6A-6B respectively illustrate some implementation details of the method shown in FIG. 2A according to another embodiment of the present invention.

Referring to FIG. 6A, suppose that the logical values $\{1, 0, 0, 1, 0, 1\}$ of the HLLHLH data pattern correspond to normalized levels $\{1, -1, -1, 1, -1, 1\}$, respectively. Thus, in a situation where the data bits $\{D_0, D_1, D_2, D_3, D_4, D_5\}$ are respectively replaced by the normalized levels $\{1, -1, -1, 1, -1, 1\}$, the edge values $E_4$ and $E_5$ can be written as follows:

$$E_4 = h_{3.5} - h_{2.5} - h_{1.5} + h_{0.5} - h_{-0.5} + h_{-1.5}; \text{ and}$$

$$E_5 = h_{4.5} - h_{3.5} - h_{2.5} + h_{1.5} - h_{0.5} + h_{-0.5};$$

In this embodiment, the response curve parameters $h_{4.5}$ and $h_{-1.5}$ are minor in comparison with the other response curve parameters in the above equations, and therefore, can be omitted. Thus, the edge values $E_4$ and $E_5$ can be written as follows:

$$E_4 = -h_{2.5} + K'; \text{ and}$$

$$E_5 = -h_{2.5} - K';$$

where $K' = h_{3.5} - h_{1.5} + h_{0.5} - h_{-0.5}$. As a result, the summation of the edge values $E_4$ and $E_5$ can be written as follows:

$$E_4 + E_5 = -2 \ast h_{2.5};$$

where the above equation implies that the summation of the normalized levels of the edge values $E_4$ and $E_5$ mainly correspond to the response curve parameter $h_{2.5}$, which in an ideal response curve should be zero. Thus, by monitoring whether the aforementioned summation of the normalized levels of the portion of the series of edge values (e.g. the summation of the normalized levels of the edge values $E_4$ and $E_5$) is equal to zero, the adaptive control circuit 120 can dynamically check whether the response curve 50 is appropriately equalized. As a result of monitoring whether the aforementioned summation of the normalized levels of the portion of the series of edge values is equal to zero, the adaptive control circuit 120 can dynamically adjusts the linear equalizer 110.

Please refer to FIG. 6B, which illustrates a table comprising some possible mapping results that may be obtained in a situation where the HLLHLH data pattern (e.g. the 100101 data pattern) is detected. Similarly, regarding the field "ISI Error", the mapping results "1", "0", and "−1" represent the meanings of "Under-compensation", "Don't care", and "Over-compensation", respectively. By utilizing the table shown in FIG. 6B, the adaptive control circuit 120 can dynamically adjusts the parameters of the linear equalizer 110 to make the response curve parameters $h_{-2.5}$ and $h_{2.5}$ be zero, i.e., the adaptive control circuit 120 can control some other control points (e.g. those that are located at a horizontal distance of 2.5 U.I. with respect to the axis of symmetry of the response curve 50) to be zero. For example, the mapping result "1" (which means "Under-compensation" in this embodiment) indicates that the control points that are located at the horizontal distance of 2.5 U.I. with respect to the axis of symmetry of the response curve 50 are too high, and the response curve parameters $h_{-2.5}$ and $h_{2.5}$ should be decreased.

In another example, the mapping result "−1" (which means "Over-compensation" in this embodiment) indicates that the control points that are located at the horizontal distance of 2.5 U.I. with respect to the axis of symmetry of the response curve 50 are too low, and the response curve parameters $h_{-2.5}$ and $h_{2.5}$ should be increased.

FIGS. 7A-7B respectively illustrate some implementation details of the method 910 shown in FIG. 2A according to an embodiment of the present invention. Based upon the tables shown in FIGS. 7A-7B, the adaptive control circuit 120 can monitor the signals DATA and DLEV to respectively adjust other two levels $V_{HHL}$ and $V_{LHL}$, for use of respectively determining the new versions of the bits DLEV[9,7,5,3,1] and DLEV[8,6,4,2,0] of the signal DLEV.

For example, the first data pattern is an HHL data pattern, and the second data pattern is a LHL data pattern. Thus, the adaptive control circuit 120 can calculate the difference 222' between the current level 212 of the HHL data pattern (e.g. the level $V_{HHL}$) and the current level 214 of the LHL data pattern (e.g. the level $V_{LHL}$) to generate the first data decision level of the plurality of data decision levels $V_{TH}$ and $-V_{TH}$, such as the decision level $V_{TH}$, and further inverts the first data decision level to generate the second data decision level such as the decision level $-V_{TH}$, where the relationship between the decision level $V_{TH}$ and the two levels $V_{HHL}$ and $V_{LHL}$ can be expressed as follows:

$$V_{TH}=(V_{HHL}-V_{LHL})/2;$$

In practice, the adaptive control circuit 120 can respectively apply the logical values of corresponding bits of the signals DATA and DLEV (e.g. the bits D[0], D[1], D[2], DLEV[1]) to the fields {D[0], D[1], D[2], DLEV[1]} of the table shown in FIG. 7A, in order to obtain one of the possible mapping results in the field "$V_{HHL}$". Regarding the field "$V_{HHL}$", the mapping results "1", "0", and "−1" represent the meanings of "DOWN", "Don't care", and "UP", respectively. For example, the mapping result "1" (which means "DOWN" in this embodiment) indicates that the level $V_{HHL}$ is too low with respect to the aforementioned current level 212, and therefore should be increased. In another example, the mapping result "−1" (which means "UP" in this embodiment) indicates that the level $V_{HHL}$ is too high with respect to the aforementioned current level 212, and therefore should be decreased. By utilizing the table shown in FIG. 7A, the adaptive control circuit 120 can dynamically adjusts the level $V_{HHL}$, in order to track onto the aforementioned current level 212 of the HHL data pattern.

Similarly, the adaptive control circuit 120 can respectively apply the logical values of corresponding bits of the signals DATA and DLEV (e.g. the bits D[0], D[1], D[2], DLEV[1]) to the fields {D[0], D[1], D[2], DLEV[1]} of the table shown in FIG. 7B, in order to obtain one of the possible mapping results in the field "$V_{LHL}$". Regarding the field "$V_{LHL}$", the mapping results "1", "0", and "−1" represent the meanings of "DOWN", "Don't care", and "UP", respectively. For example, the mapping result "1" (which means "DOWN" in this embodiment) indicates that the level $V_{LHL}$ is too low with respect to the aforementioned current level 214, and therefore should be increased. In another example, the mapping result "−1" (which means "UP" in this embodiment) indicates that the level $V_{LHL}$ is too high with respect to the aforementioned current level 214, and therefore should be decreased. By utilizing the table shown in FIG. 7B, the adaptive control circuit 120 can dynamically adjusts the level $V_{LHL}$, in order to track onto the aforementioned current level 214 of the LHL data pattern.

Figure 8A:
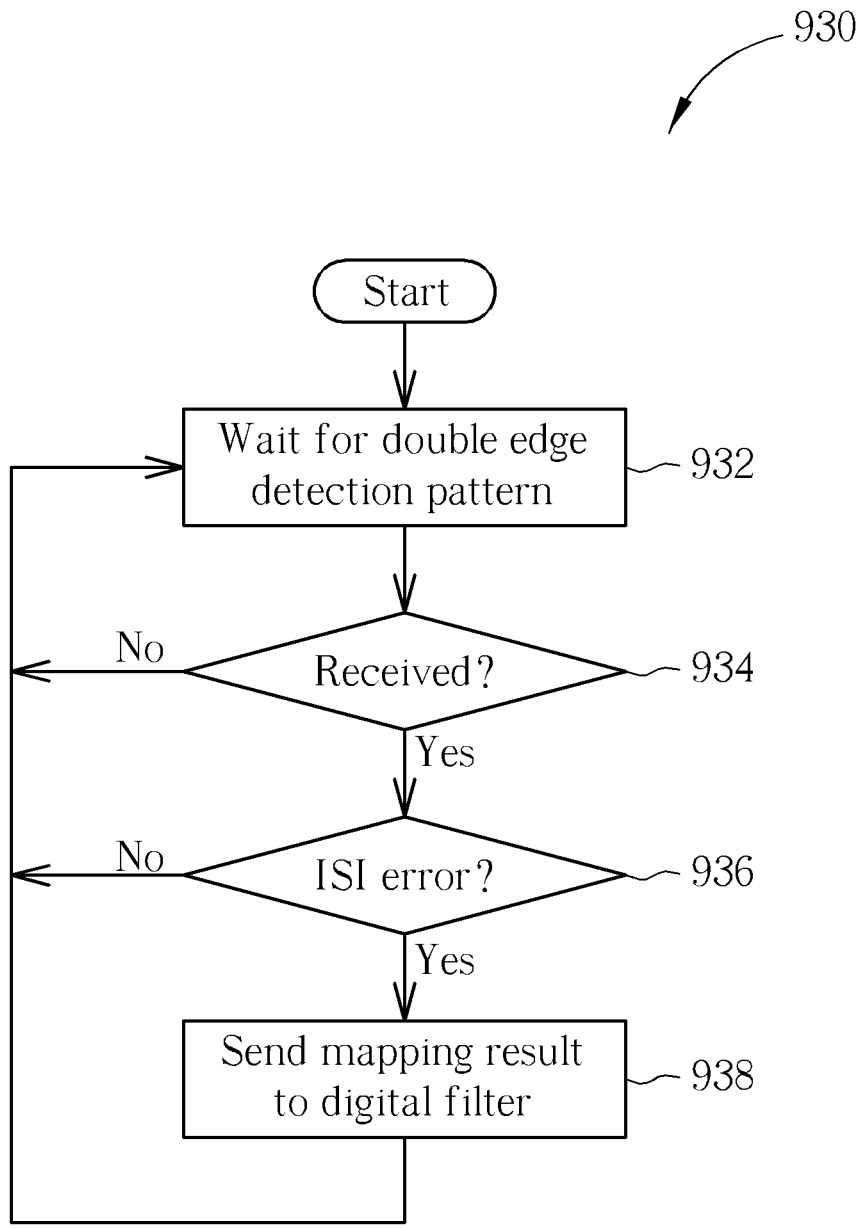
FIGS. 8A-8C respectively illustrate some implementation details of the method shown in FIG. 2A according to other embodiments of the present invention.
Figure 8B:
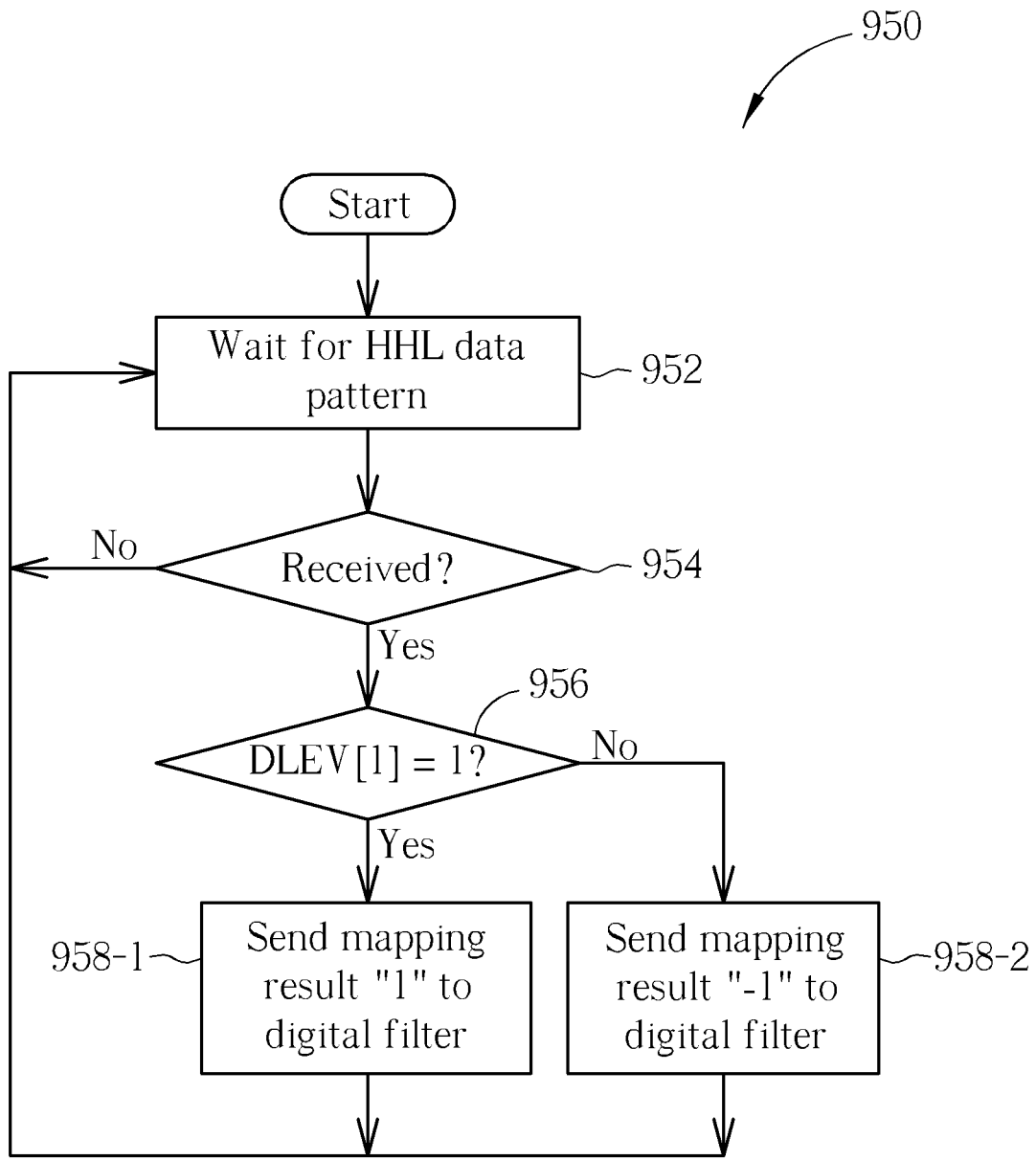
Figure 8C:
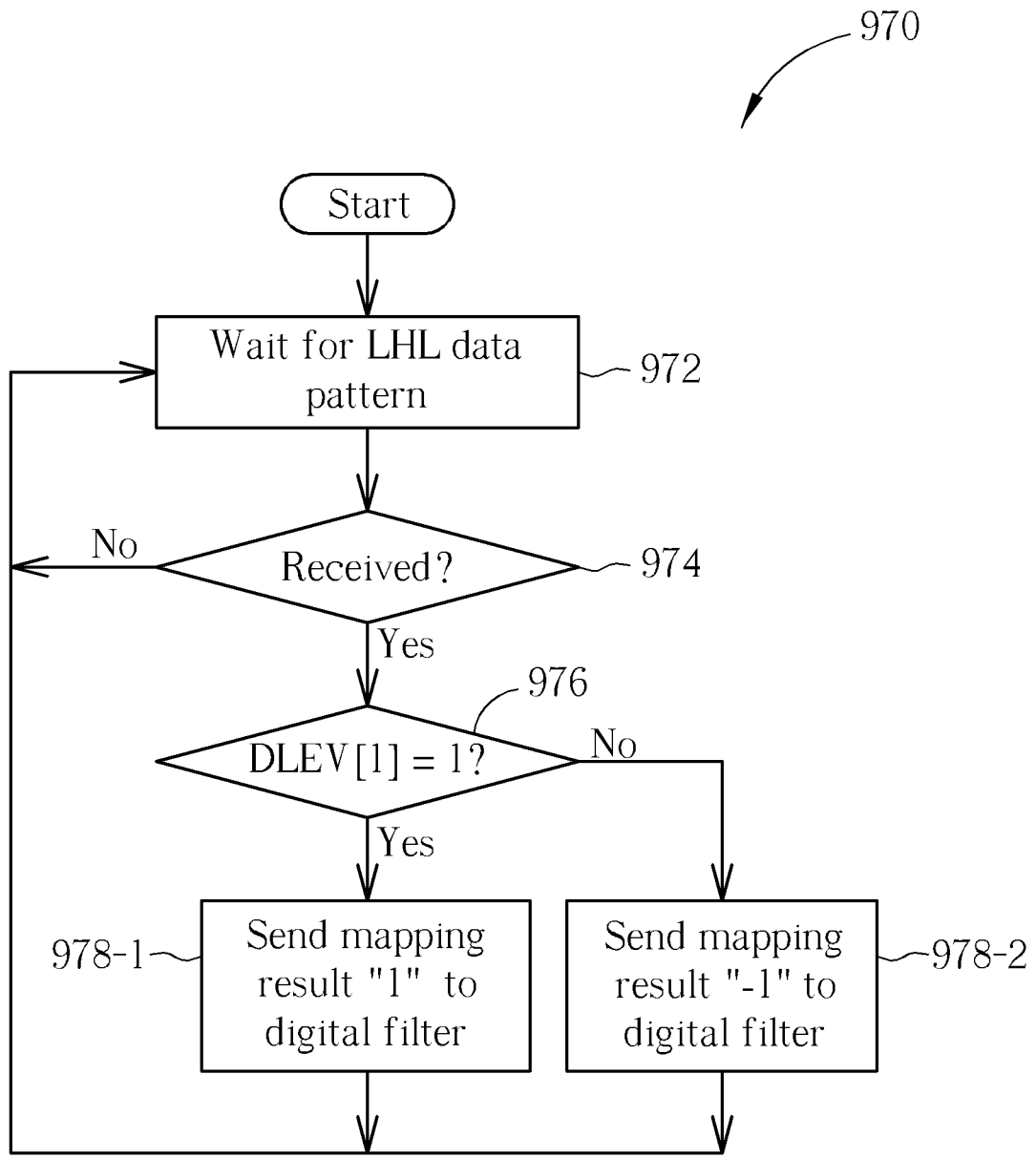

FIGS. 8A-8C respectively illustrate some implementation details of the method 910 shown in FIG. 2A according to other embodiments of the present invention. The working flow 930 shown in FIG. 8A is utilized for detecting residual ISI, and the working flow 950 shown in FIG. 8B and the working flow 970 shown in FIG. 8C are utilized for detecting data patterns, and more particularly, the aforementioned HHL data pattern and the aforementioned LHL data pattern, respectively.

Referring to FIG. 8A, in Step 932, the adaptive control circuit 120 waits for a double edge detection pattern, such as any of the aforementioned LHLLHLH data pattern in the embodiment shown in FIG. 5A and the aforementioned HLLHLH data pattern in the embodiment shown in FIG. 6A.

In Step 934, the adaptive control circuit 120 checks whether the double edge detection pattern is received. When it is detected that the double edge detection pattern is received, Step 936 is entered; otherwise, Step 932 is re-entered.

In Step 936, the adaptive control circuit 120 checks whether an ISI error is detected. When the ISI error is detected, Step 938 is entered; otherwise, Step 932 is re-entered. For example, based upon the embodiment shown in FIG. 5A and/or the embodiment shown in FIG. 6A, when any of the mapping results "1" and "−1" regarding the field "ISI Error" is obtained, the adaptive control circuit 120 determines that the ISI error is detected. In another example, based upon the embodiment shown in FIG. 5A and/or the embodiment shown in FIG. 6A, when the mapping result "0" regarding the field "ISI Error" is obtained, the adaptive control circuit 120 determines that no ISI error is detected.

In Step 938, the adaptive control circuit 120 sends the mapping result to a digital filter therein, for converting the mapping result into a digital code that is utilized for controlling the linear equalizer 110. For example, based upon the embodiment shown in FIG. 5A and/or the embodiment shown in FIG. 6A, when the mapping result "1" regarding the field "ISI Error" is obtained, the adaptive control circuit 120 sends the mapping result "1" to the digital filter. In another example, based upon the embodiment shown in FIG. 5A and/or the embodiment shown in FIG. 6A, when the mapping result "−1" regarding the field "ISI Error" is obtained, the adaptive control circuit 120 sends the mapping result "−1" to the digital filter. After Step 938 is executed, Step 932 is re-entered.

Referring to FIG. 8B, in Step 952, the adaptive control circuit 120 waits for the aforementioned HHL data pattern, which is disclosed in the embodiment shown in FIG. 7A.

In Step 954, the adaptive control circuit 120 checks whether the HHL data pattern is received. When it is detected that the HHL data pattern is received, Step 956 is entered; otherwise, Step 952 is re-entered.

In Step 956, the adaptive control circuit 120 checks whether DLEV[1]=1. When DLEV[1]=1, Step 958-1 is entered; otherwise, Step 958-2 is entered. For example, based upon the embodiment shown in FIG. 7A, when DLEV[1]=1, the adaptive control circuit 120 determines that a $V_{HHL}$ error of the "DOWN" direction is detected. In another example, based upon the embodiment shown in FIG. 7A, when DLEV[1]=0, the adaptive control circuit 120 determines that a $V_{HHL}$ error of the "UP" direction is detected.

In Step 958-1, the adaptive control circuit 120 sends the mapping result "1" to a digital filter therein, for converting the mapping result "1" into a digital code that is utilized for controlling the DFE data recovery circuit 130. In practice, the digital filter of the embodiment shown in FIG. 8B can be the same digital filter disclosed in the embodiment shown in FIG. 8A, or can be another digital filter that differs from the digital filter disclosed in the embodiment shown in FIG. 8A. For example, based upon the embodiment shown in FIG. 7A, when the mapping result "1" regarding the field "$V_{HHL}$" is obtained, the adaptive control circuit 120 sends the mapping result "1" to the digital filter. After Step 958-1 is executed, Step 952 is re-entered.

In Step 958-2, the adaptive control circuit 120 sends the mapping result "−1" to the digital filter therein, for converting the mapping result "−1" into a digital code that is utilized for controlling the DFE data recovery circuit 130. For example, based upon the embodiment shown in FIG. 7A, when the mapping result "−1" regarding the field "$V_{HHL}$" is obtained, the adaptive control circuit 120 sends the mapping result "−1" to the digital filter. After Step 958-2 is executed, Step 952 is re-entered.

Referring to FIG. 8C, in Step 972, the adaptive control circuit 120 waits for the aforementioned LHL data pattern, which is disclosed in the embodiment shown in FIG. 7B.

In Step 974, the adaptive control circuit 120 checks whether the LHL data pattern is received. When it is detected that the LHL data pattern is received, Step 976 is entered; otherwise, Step 972 is re-entered.

In Step 976, the adaptive control circuit 120 checks whether DLEV[1]=1. When DLEV[1]=1, Step 978-1 is entered; otherwise, Step 978-2 is entered. For example, based upon the embodiment shown in FIG. 7B, when DLEV[1]=1, the adaptive control circuit 120 determines that a $V_{LHL}$ error of the "DOWN" direction is detected. In another example, based upon the embodiment shown in FIG. 7B, when DLEV[1]=0, the adaptive control circuit 120 determines that a $V_{LHL}$ error of the "UP" direction is detected.

In Step 978-1, the adaptive control circuit 120 sends the mapping result "1" to a digital filter therein, for converting the mapping result "1" into a digital code that is utilized for controlling the DFE data recovery circuit 130. In practice, the digital filter of the embodiment shown in FIG. 8C can be the same digital filter disclosed in the embodiment shown in FIG. 8B. For example, based upon the embodiment shown in FIG. 7B, when the mapping result "1" regarding the field "$V_{LHL}$" is obtained, the adaptive control circuit 120 sends the mapping result "1" to the digital filter. After Step 978-1 is executed, Step 972 is re-entered.

In Step 978-2, the adaptive control circuit 120 sends the mapping result "−1" to the digital filter therein, for converting the mapping result "−1" into a digital code that is utilized for controlling the DFE data recovery circuit 130. For example, based upon the embodiment shown in FIG. 7B, when the mapping result "−1" regarding the field "$V_{LHL}$" is obtained, the adaptive control circuit 120 sends the mapping result "−1" to the digital filter. After Step 978-2 is executed, Step 972 is re-entered.

It is an advantage of the present invention that the present invention methods and associated apparatus can satisfy a wide range of operation conditions. In addition, the adaptive control mechanism for both equalization and data recovery guarantees high performance, reliability, and fidelity of the HDMI receiver that is implemented based upon the present invention methods. Additionally, based upon the present invention, the HDMI receiver is capable of adaptively adjusting its loop frequency response with respect to the stream-in data rate.

Those skilled in the art will readily observe that numerous modifications and alterations of the device and method may be made while retaining the teachings of the invention.

What is claimed is:

1. A method for performing adaptive equalization, the method being applied to a decision feedback equalizer (DFE) data recovery circuit for a linear equalizer, the method comprising:
dynamically detecting current levels of a plurality of data patterns, wherein each data pattern comprises a previous level, a current level, and a next level, by identifying the current level according to the previous level, the current level and the next level, and comparing the current levels with a data decision level determined according to a previous level of the plurality of data patterns;
dynamically setting new data decision levels according to only the detected current levels of the data patterns, for use of data decision, in order to enhance a signal-to-noise ratio (SNR) of data from the DFE data recovery circuit;
for a previous level partial response of the plurality of data patterns, selecting one of the dynamically set new data decision levels; and
comparing the selected data decision level with the previous level partial response to output a data decision result.

2. The method of claim 1, wherein the new data decision level is not equal to zero.

3. The method of claim 1, further comprising predefining a first data pattern and a second data pattern and detecting whether the first and the second data patterns are received; the step of dynamically detecting the current levels of the plurality of data patterns further comprises detecting current levels respectively corresponding to the first and the second data patterns when the first and the second data patterns are detected; and the step of dynamically setting the new data decision level further comprises:
setting the new data decision level according to the detected current level corresponding to the first data pattern and the detected current level corresponding to the second data pattern.

4. The method of claim 3, wherein the step of dynamically setting the new data decision level further comprises:
calculating an average of the current level of the first data pattern and the current level of the second data pattern to generate the new data decision level.

5. The method of claim 3, wherein the step of dynamically setting the new data decision level further comprises:
calculating a difference between the current level of the first data pattern and the current level of the second data pattern to generate the new data decision level.

6. The method of claim 3, wherein the step of dynamically setting the new data decision level further comprises:
setting another new data decision level by inverting the new data decision level.

7. An apparatus for performing adaptive equalization, the apparatus comprising:
a linear equalizer arranged to perform equalization;
an adaptive control circuit arranged to perform adaptive control; and
a decision feedback equalizer (DFE) data recovery circuit arranged to perform data recovery, wherein under control of the adaptive control circuit, the DFE data recovery circuit dynamically detects current levels of a plurality of data patterns, wherein each data pattern comprises a previous level, a current level, and a next level, by identifying the current level according to the previous level, the current level and the next level, and comparing the current levels with a data decision level determined according to a previous level of the plurality of data patterns, and for a previous level partial response of the plurality of data patterns, selecting a new data decision level and comparing the selected new data decision level with the previous level partial response to output a data decision result;

wherein new data decision levels for use of data decision are dynamically set in accordance with only the detected current levels of the data patterns, in order to enhance a signal-to-noise ratio (SNR) of data from the DFE data recovery circuit.

8. The apparatus of claim 7, wherein the new data decision level is not equal to zero.

9. The apparatus of claim 7, wherein the data patterns comprise a predefined first data pattern and a predefined second data pattern; and the adaptive control circuit sets the new data decision level according to a current level corresponding to the first data pattern and a current level corresponding to the second data pattern when the first and the second data patterns are detected.

10. The apparatus of claim 9, wherein the adaptive control circuit calculates an average of the current level of the first data pattern and the current level of the second data pattern to generate the new data decision level.

11. The apparatus of claim 9, wherein the adaptive control circuit calculates a difference between the current level of the first data pattern and the current level of the second data pattern to generate the new data decision level.

12. The apparatus of claim 9, wherein the adaptive control circuit further inverts the new data decision level to set another new data decision level.

* * * * *